(No Model.)
C. F. HADLEY.
LOOP FRAME FOR TRICYCLES.
No. 335,811. Patented Feb. 9, 1886.
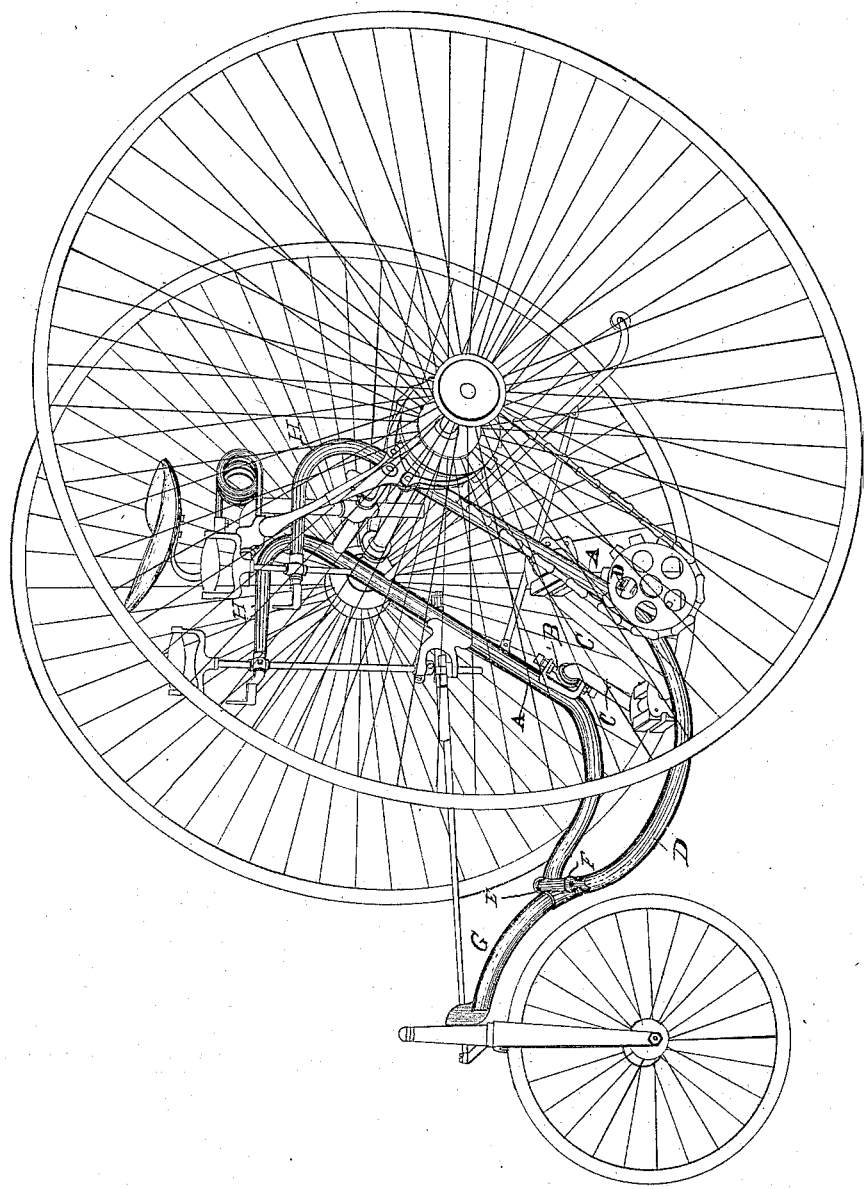
WITNESSES:
INVENTOR
Charles F. Hadley
BY George W. Seymour
ATTORNEY

UNITED STATES PATENT OFFICE.

CHARLES F. HADLEY, OF CHICOPEE, MASSACHUSETTS, ASSIGNOR TO THE OVERMAN WHEEL COMPANY, OF SAME PLACE.

LOOP-FRAME FOR TRICYCLES.

SPECIFICATION forming part of Letters Patent No. 335,811, dated February 9, 1886.

Application filed November 28, 1884. Serial No. 149,015. (No model.)

*To all whom it may concern:*

Be it known that I, CHARLES F. HADLEY, residing at Chicopee, in the county of Hampden and State of Massachusetts, have invented certain new and useful Improvements in Loop-Frames for Tricycles; and I do declare the following to be a full, clear, and exact description of the same, reference being had to the accompanying drawing, which forms a part of this specification.

My invention relates to an improvement in loop-frames for tricycles, the object being to produce a frame of superior rigidity and convenience, and one adapted to bring the pedals into the most advantageous position for driving, to escape in great measure the soil of travel and disfigurement, and to have its foot-rest attached directly to the loop of its body.

With these ends in view my invention consists in a loop-frame constructed on elevated lines, and having its sides inclined for the attachment of the crank of the vehicle to their under faces, and in position to locate it well toward or under the seat thereof, and its loop depressed below the bearings of the crank and upturned at its forward end to the elevation required for the foot-rest.

My invention further consists in a loop-frame having certain details of construction, as will be hereinafter described, and pointed out in the claims.

The accompanying drawing represents in perspective a tricycle having a loop-frame embodying my invention.

My improved frame is constructed on elevated lines with parallel sides A, inclined for the attachment to their lower faces of the bearings B of the crank C, and so as to locate the same well toward or under the seat of the vehicle, and with a loop, D, merging at its rear end into the said parallel sides and extending below the bearings B of the crank C, and upturned at its forward end to the elevation required for the foot-rest, which, as herein shown, consists of a bar, E, secured by attachments F directly to the loop. The frame is also constructed with a short reach, G, extending forward from the loop, and with arms H, forming extensions of the upper ends of its sides.

By inclining or pitching the sides of the frame for the attachment of the crank to their under faces, and in position to locate it well toward or under the seat occupied by the driver, the advantages are gained of bringing the pedals into a position enabling the driver to drive the machine by an easy and natural motion closely like that of walking, and to utilize his weight to the best advantage in throwing it upon the pedals. Furthermore, by the location of the bearings of the cranks upon the sides of the frame and upon their under faces they are at once protected from injury and placed out of the way of the driver, and the elevation above the road-bed secured for the bearings, crank, and pedals shields them to a great extent from flying dirt and dust.

The extension or depression of the loop below the bearings of the crank secures for the frame the convenience of frames constructed on lower or depressed lines, while the upturning of its forward end to the elevation required for the foot-rest permits the same to be attached directly to it with a gain of compactness and efficiency in the machine and of convenience to the driver.

The shaping of the frame on generally elevated lines, and particularly the upturning of the forward end of the loop, as described, shortens the reach and renders a guard for shielding the driver and frame from the dirt thrown by the steering-wheel unnecessary, and also, by improving the leverage, makes the frame stiffer under the weight of the driver when in the seat and when mounting and dismounting. Moreover, the construction of the frame on generally elevated lines secures for it comparative freedom against the soil of travel, and protects it against disfigurement.

I am aware that a loop-frame for tricycles constructed on generally depressed or low lines, with perpendicular parallel sides extending downward from the axle of the vehicle, and with a horizontal loop merging into the said sides and at right angles therewith, having the crank attached to its lower face, and provided with a long reach, is not new, and I do not, therefore, broadly claim a loop-frame having parallel sides and a loop located in different planes, but only a frame having the characteristics and particular shape of the frame herein shown and described.

Having fully described my invention, what I claim as new, and desire to secure by Letters Patent, is—

1. A loop-frame for tricycles, constructed on elevated lines and having its sides inclined, substantially as shown, for the attachment of the crank of the vehicle to their under faces and in position to locate it well toward or under the seat of the vehicle, and its loop shaped substantially as shown and carried below the bearings of the crank and upturned at its forward end to the elevation required for the foot-rest, substantially as set forth.

2. A loop-frame for tricycles, constructed on elevated lines and having its sides inclined, substantially as shown, for the attachment of the crank of the vehicle to their under faces and in position to locate it well toward or under the seat of the vehicle, and its loop shaped substantially as shown and carried below the bearings of the crank, and upturned at its forward end, and having a short reach and provided with a foot-rest consisting of a rod attached directly to the upturned end of the loop, substantially as set forth.

In testimony whereof I have signed this specification in the presence of two subscribing witnesses.

CHARLES F. HADLEY.

Witnesses:
LEWIS A. STERLING,
ALBERT PERKINS.